United States Patent [19]

Gruber

[11] Patent Number: 5,820,321

[45] Date of Patent: Oct. 13, 1998

[54] EXPANSION PLUG WITH TENSIONING MEMBER AND TWO EXPANSION TUBES

[75] Inventor: Heinz Gruber, Seesen/Rhüden., Germany

[73] Assignee: GD-Anker Gruber-Duebel-Anker GmbH, Seesen/Rhueden, Germany

[21] Appl. No.: 525,692

[22] PCT Filed: Mar. 17, 1994

[86] PCT No.: PCT/EP94/00841

§ 371 Date: Sep. 15, 1995

§ 102(e) Date: Sep. 15, 1995

[87] PCT Pub. No.: WO94/23216

PCT Pub. Date: Oct. 13, 1994

[30] Foreign Application Priority Data

Apr. 5, 1993 [DE] Germany ............... 43 10 796.6

[51] Int. Cl.[6] ............................................. F16B 13/04
[52] U.S. Cl. ......................... 411/36; 411/38; 411/59; 411/60
[58] Field of Search ............... 411/34–38, 55, 411/59, 60, 29, 30

[56] References Cited

U.S. PATENT DOCUMENTS

| 2,269,646 | 1/1942 | Burke | 411/38 |
| 3,942,407 | 3/1976 | Mortensen | 411/36 |
| 4,920,833 | 5/1990 | Rosenthal | 411/34 |

FOREIGN PATENT DOCUMENTS

| 598730 | 2/1948 | United Kingdom | 411/36 |

*Primary Examiner*—Flemming Saether
*Attorney, Agent, or Firm*—Michael J. Striker

[57] ABSTRACT

An expansion plug has at least one tensioning member, an expansion means formed by a system of at least two expansion tubes encircling the tensioning member and fitted one within another, each of the expansion tubes being provided with a series of slots which are equally spaced in a circumferential direction to retain peripheral sections of the expansion tubes between the slots, the slots extending over a part of a length of the expansion tubes, the tensioning member and the at least two expansion tubes being dimensioned and shaped so that by inserting an axial relative movement the peripheral sections are radially expanded in order to achieve an anchoring effect, the slots of the at least two expansion tubes having a shape which is helical in relation to an axis of a respective one of the expansion tubes, the slots having a slope such that the slope of radially adjacent ones of the expansion tubes are of mutually opposite hand, the expansion tubes being arranged to be non-rotatable relative to one another.

28 Claims, 8 Drawing Sheets

FIG. 2
FIG. 3
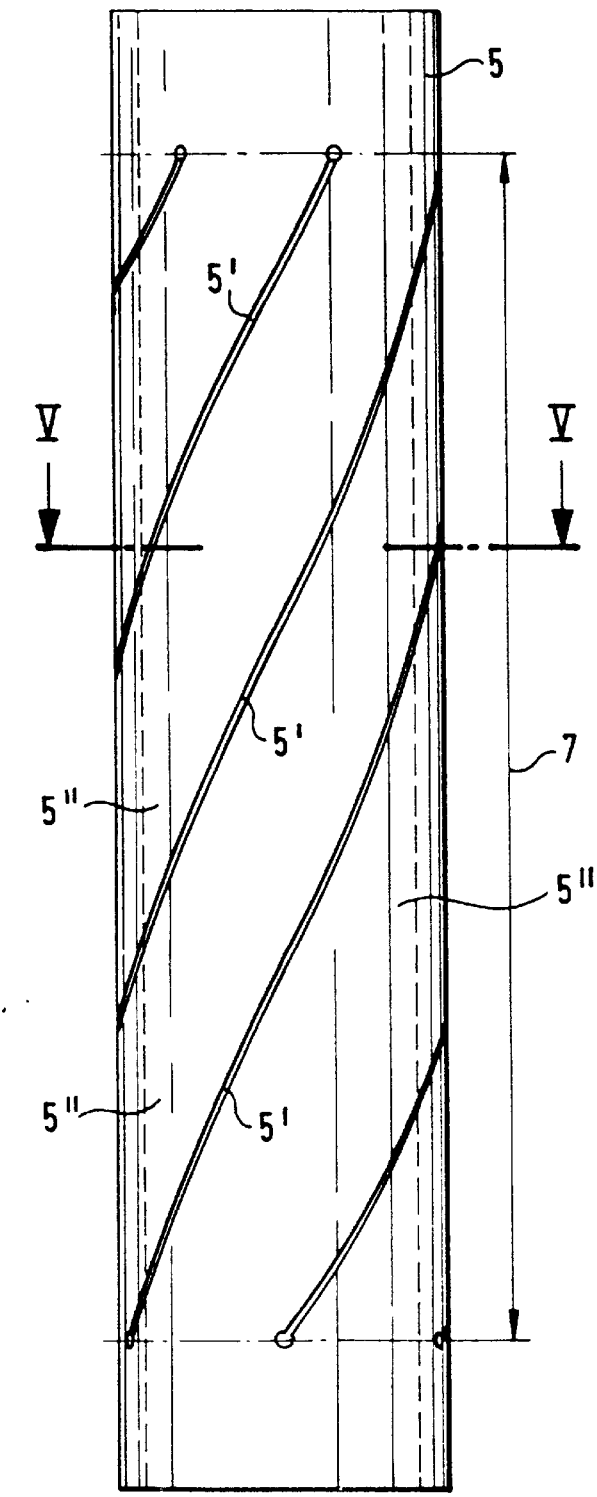
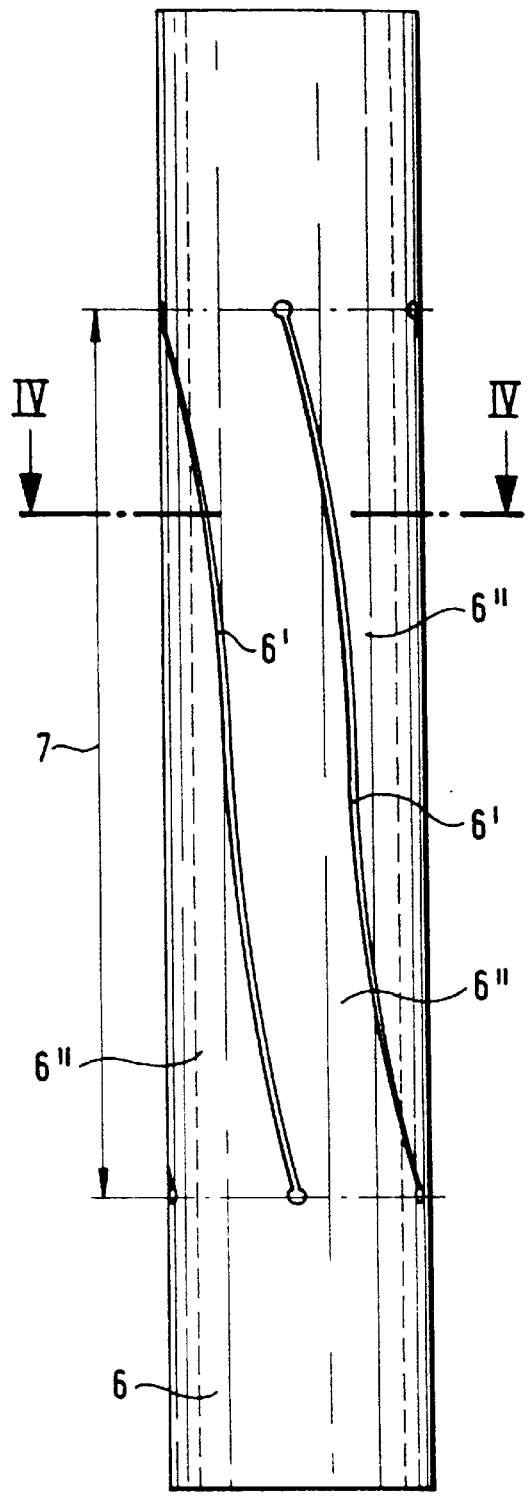

EXPANSION PLUG WITH TENSIONING MEMBER AND TWO EXPANSION TUBES

BACKGROUND OF THE INVENTION

The present invention relates generally to an expansion plug.

More particularly, it relates to an expansion plug which has at least one tensioning member and expansion means formed by a system of at least two expansion tubes encircling the tensioning member and fitted one within another, with each of the expansion tubes provided with a series of helical slots spaced in a circumferential direction and extending over a part of the length of the expansion tubes, so that by inserting an axial relative movement the peripheral sections are radially expanded in order to achieve an anchoring effect.

Expansion plugs are known in very many forms and serve for example for the stabilisation of walls, the formation of fixing points for the mounting, particularly hanging, of objects, and so on. They can be set into an existing bore in a wall, or they can be rammed into the wall or into the ground, and by the relative displacement of movable parts of the expansion plug—as a rule in the region of the bottom of the borehole—an expansion, notably an increase in diameter, of the relevant parts is produced which makes it possible for the plug to be held tight in relation to the material of the wall of the borehole and in this way to fix the plug.

From DE-OS 22 13 711 there is known an expandable screw fixing device whose essential feature consists of two expansion tubes of plastics material guided coaxially in one another, encircling a screw, and tensioned axially between a nut on the one hand and a point adjacent to the screw head on the other hand. Both expansion tubes are provided with a series of slots which define respective peripheral sections and which can have an axial or alternatively a spiral configuration. The outer expansion tube is connected to the nut by a connection which has an axially-acting shape-locking effect. The inner expansion tube defines a limit for the screwing in of the aforesaid screw, which is determined decisively by the length of the axial slots of this expansion tube which are shown.

SUMMARY OF THE INVENTION

Accordingly, it is an object of the present invention to provide an expansion plug which avoids the disadvantages of the prior art.

More particularly, it is the object of the invention to provide an expansion plug of the type first referred to above in which its usability is further improved, particularly for walls and ground conditions which are characterised by having poor strength or supporting capabilities, but also having regard to the force take-up capacity of the expanding body, particularly in its use as an abutment or stop. This object is achieved, in an expansion plug of the type first referred to above, by the slope of the slots of radially adjacent expansion tubes being of mutually opposite hand, and by the expansion tubes being arranged to be non-rotatable relative to one another.

The expansion device comprises an arrangement of at least two expansion tubes set one within the other, which are each provided with slots between which strip-like peripheral sections of tube remain, so that, by an axial compression, the peripheral sections remaining between the slots are radially expanded, and indeed by plastic deformation, so that the plastically deformed peripheral sections form a spatial structure which represents an anchoring body. Because the expansion tubes are positioned within one another, the expanded peripheral sections of the two tubes exert a supporting, and in particular reinforcing, effect on each other, which gives the expansion plug an increased resistance to tensile forces. It is an important feature of the invention that the slope of the helical slots of radially adjacent expansion tubes is of mutually opposite hand, with comparatively steep angles of slope being preferred. This means that in the case of the radial expansion the plastically deformed peripheral sections form a spatial structure which is characterised by a considerable rigidity and strength, indeed against both axial and also torsional stresses. In the expanded state one has an expanded body which is rotationally symmetrical as far as possible, which, depending upon the degree of expansion, can approximate to a disc-like or ball-like shape, and which is characterised by a high mechanical stability. In order further to increase the strength, three or more coaxial, nested expansion tubes could be provided, so that in the case of the axial compression of this arrangement the peripheral sections of three or more expansion tubes are radially expanded and form an expanded or anchoring body. The expansion tubes are preferably of metal, although they can equally well be made of a suitable plastics material. It is an important feature of the invention that the expansion tubes are connected so that they are not rotatable one relative to another. This means that in the case of the axial compression one has significant, and in particular reproducible, deformation characteristics, and indeed independently of the type of tensioning member which is used and independently of the question as to the manner in which an axial compression of the nested compression tubes is achieved. In this way, one achieves as a consequence an expansion member shaped in a defined way and with defined strength properties. This non-rotatable connection can be achieved by the use of oval or polygonal tube cross-sections for the expansion tubes. Particularly advantageous however is the use of circular cross-section tubes as expansion tubes, which are fixedly connected at their end zones, for example by being welded to each other.

According to further features, the expansion tubes can either be formed as smooth-walled tubes or alternatively as threaded tubes. In the case of their formation as threaded tubes this naturally opens up many possibilities for the use of this thread, for example to improve the anchoring in the ground or in the case of the use of mortar with the mortar, or with some other hardenable medium. The threaded arrangement also brings about the advantage that this thread can be used possibly for screwing purposes, for example in order to mount a closure member, a driving tip, a drill head or some other functional element by means of which the one end of the expansion tubes can be fixedly connected to the tensioning member.

The other features are directed to a further embodiment of the expansion tubes. All expansion tubes of one nested arrangement of tubes preferably have a common length, and the expansion tubes can extend either over a part of the length of the tensioning member or alternatively over its full length. In the first case, separate intermediate members are necessary in order to transfer the forces. More details of this will be given in the following description.

The expansion plug in accordance with the invention is based on the principle that the at least one axial array of nested expansion tubes must have an axially effective compression force exerted thereon in order to effect the expansion process for the said peripheral sections, with this compression force being brought about by an axial relative movement of the tensioning member in relation to the expansion tubes. This naturally presupposes that the expansion tubes are tensioned between two force-introducing points and are moved relative to one another for the purpose of carrying out the expansion movement.

The additional features indicate the important possibilities for the constructional realisation of this principle, in each case starting from the fact that the expansion process begins with the expansion plug set in place, and consequently just by acting on an end of the tensioning member which is free to the air and its relative movement in relation to an opposing member, for example an anchor plate, against which the system of the expansion tubes bears either directly or through the intermediary of a fitting tube. The simplest solution of this principle is that at one end of the tensioning member there is provided an annular shoulder which can be for example an integral component of a driving tip, a drill head or some other structural member located at this end of the tensioning member, with this component being welded or screwed to the tensioning member. In the simplest case, one such driving tip with annular shoulder can be produced by an upsetting process in the course of a forging process. This annular shoulder forms the force-transmitting element for the exertion of a compression force on the system of expansion tubes, possibly with the provision of a fitting tube between the expansion tubes and this annular shoulder, since the system of expansion tubes can be provided basically at any location along the tensioning member. The fitting tube may be supported just by the expansion tubes. It can however alternatively be fixedly connected to the adjacent end of the expansion tubes, for example by being welded thereto. Alternatively, the expansion tubes can be fixedly connected at one end to the central tensioning member.

The expansion tubes can have a circular cross-section.

The expansion tubes can alternatively have any polygonal cross-section, in particular a rectangular or square or even an oval cross-section.

A plurality of sets of nested expansion tubes can be provided along the tensioning member, possibly with fitting tubes acting as force-transmitting members provided between the sets. In this way one creates the possibility of having multiple anchoring points along a tensioning member. If needed, the fitting tubes can be fixedly connected to the expansion tubes.

Basically, the expansion tubes—viewed along their axial length can be equipped with more than one slot arrangement, so that after expansion of the respective peripheral sections, a plurality of expansion bodies arranged axially spaced from one another are created.

The tensioning member may be formed as a solid rod or threaded rod or as a tubular member provided preferably at least with a continuous external thread. By providing radial bores at one end zone there is in this way the possibility of using the expansion plug simultaneously for flushing purposes and also as an injection drilling anchor or self-boring anchor. Radial bores are preferably located at the regions which are associated directly with the expansible peripheral sections of the expansion tubes, so that in the case of use as an injection drilling anchor these bores can be used for the entry of mortar at these locations or for the entry of some other hardenable medium to create a further stiffening of the expansion member. The tensioning rod arranged within the expansion tubes can function as the actual tensioning member. However, the system of expansion tubes and a fitting tube which is fixedly connected to the expansion tubes can serve as tensioning member. Finally, there is also the possibility of using a central tensioning rod and the fitting tube encircling this simultaneously as tensioning member.

Next features are directed to the production of reproducible deformation characteristics and to the creation of an expansion or anchoring member of high strength. It is important in connection with this that the strip-like peripheral sections intersect at an angle which is less than or equal to 90° in a central region. This means that, by reason of the strip-like formation of the peripheral sections of the expansion member, an optimum resistance, due to shape, is present to counter those bending stresses whose bending axes extend parallel to the narrow sides of the cross-section of the expanded peripheral sections. Simultaneously, by this orientation of the expanded peripheral sections one produces a stiffening of the expansion member against radial stresses, with this stiffening being again due to shape. The aforesaid angle $\alpha$ is preferably greater than 30°, and is preferably within the range of 45° to 90°.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is an illustration of the outer expansion tube of the expansion plug shown in FIG. 1;

FIG. 3 is an illustration of the inner expansion tube of the expansion plug shown in FIG. 1;

DESCRIPTION OF THE PREFERRED EMBODIMENTS

Figure 1:
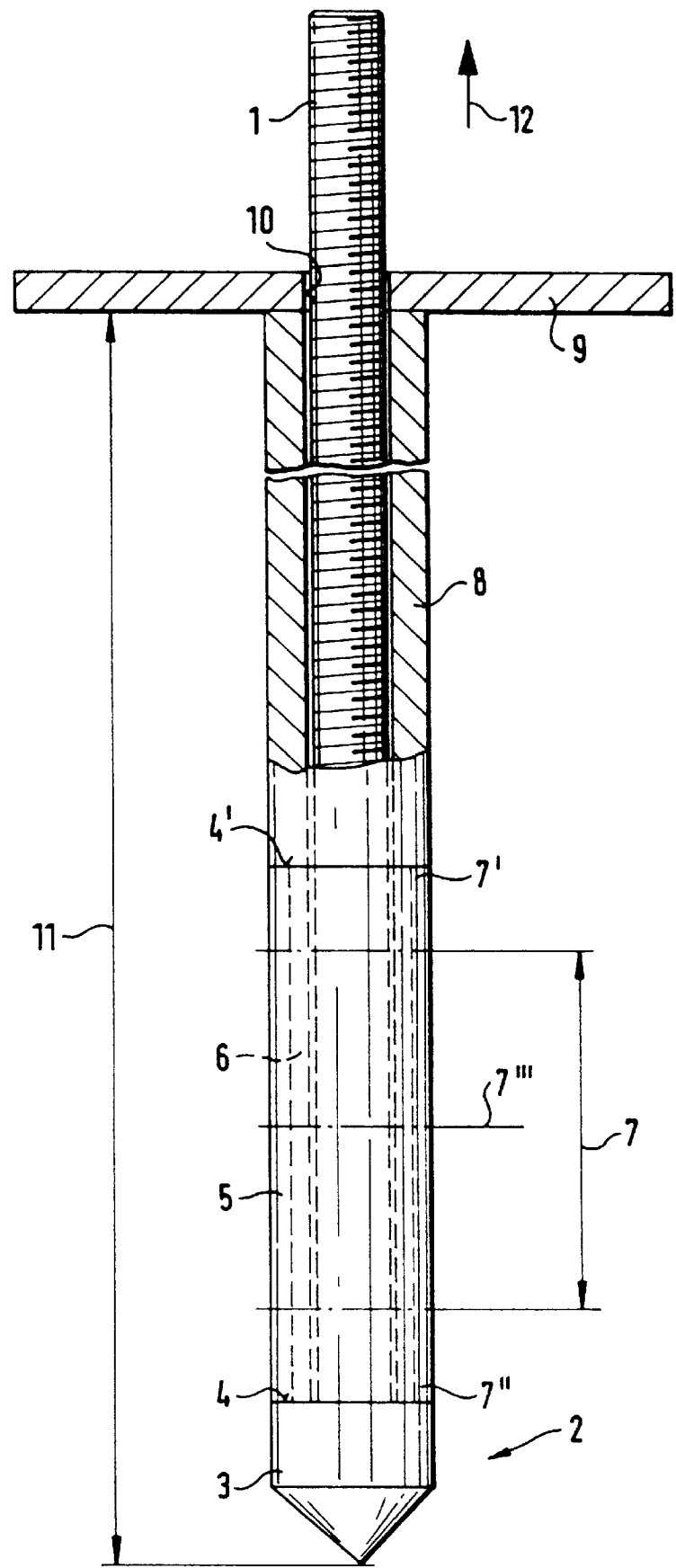
FIG. 1 is a partial longitudinal sectional view through a first embodiment of expansion plug.
Figure 4:
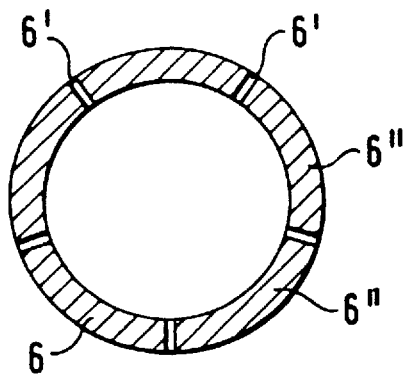
FIG. 4 is a radial sectional view of the expansion tube shown in FIG. 3, taken along the section line IV—IV.
Figure 5:
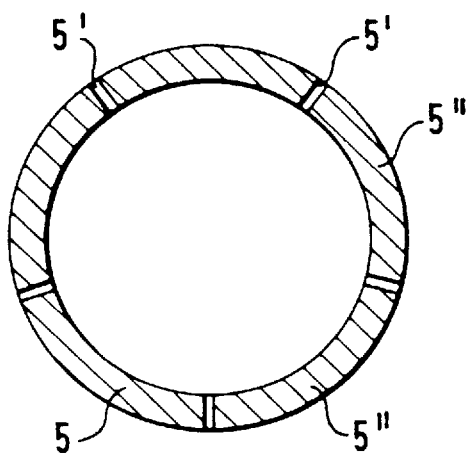
FIG. 5 is a radial sectional view of the expansion tube shown in FIG. 2, taken along the section line V—V.

In FIG. 1 the reference numeral 1 indicates a tensioning member, here shown as a threaded rod, which is provided at its one end 2 with a driving tip 3. The driving tip 3 can be formed as a separate body and can be screwed on to this end of the threaded rod. Alternatively, it can just as well be welded on to this end of the rod. Yet again, it is also possible to form the driving tip 3 in situ at the end 2 of the threaded rod 1 in a forging process. It is important that in each case, in the region of the driving tip, and indeed on its rearward-facing end, an annular shoulder 4 is created which forms a seating surface for two coaxial expansion tubes 5, 6 which are arranged one within the other. Both expansion tubes, namely the outer tube 5 and the inner tube 6, are provided with slots in a manner which will be described in more detail hereinafter. The slots are provided within a zone 7 of the tubes which, for the rest, are formed as smooth-walled tubular bodies.

The internal diameter of the inner expansion tube 6 and the external diameter of the threaded rod 1 are dimensioned so that both expansion tubes 5 and 6 are displaceable without difficulty over the threaded rod 1, allowing for a trifling amount of play, until they come into contact with the annular shoulder 4.

The two expansion tubes 5, 6 have the same length and at their ends which are remote from the driving tip 3 form an annular shoulder 4' whose radial thickness corresponds substantially to the combined wall thickness of the two expansion tubes 5, 6.

The expansion tubes 5,6 are fixedly connected to each other at their end regions 7', 7". This fixed connection can be effected in any way.

The reference numeral 8 indicates a fitting tube which is supported axially on the annular shoulder 4' and whose wall thickness corresponds substantially to the dimensions of this annular shoulder 4'. The fitting tube 8 extends over the full remaining length of the expansion plug and is secured in a suitable manner to an anchor plate 9 at its end which is remote from the annular shoulder 4'. A fixed connection, especially a welded connection, can exist between the fitting tube and the expansion tubes.

The anchor plate 9, whose design can take substantially any form, has a bore 10 therethrough which is coaxial with respect to the common axis of the fitting tube 8 and of the threaded rod 1. The end of the threaded rod 1 which is remote from the driving tip 3 passes through this bore 10 and projects therefrom.

The expansion tubes 5, 6 are provided with a series of slots 5', 6' which run helically in relation to the axis of the respective expansion tubes, each with a comparatively steep path. The end points of each of the slots are located on circumferential lines whose distance from one another corresponds to the length of the aforesaid zone 7. This zone for the slots of the inner expansion tube can be made slightly shorter. Between the slots 5' 6' there are respective strip-like peripheral sections 5", 6" whose significance will be explained in more detail later. It is important that the number of slots 5', 6' provided in the two expansion tubes is the same, and that the slots, viewed in the circumferential direction, are uniformly spaced and that the aforesaid peripheral sections 5", 6" have the same width dimension. However, the slots could be positioned in such a way that the width dimension of the peripheral sections increases in one direction. It is also important that the slope of the helical paths of the slots 5', 6' runs in mutually opposite directions.

The peripheral sections 5", 6" are preferably arranged so that in the expanded state their respective central regions touch and exert a supporting action on one another. This is achieved by the slots 5', 6' of all the expansion tubes 5, 6 extending symmetrically in relation to the plane 7'" in the axial direction within the zone 7, with the plane 7'" being the central plane of the zone 7. The peripheral sections can furthermore be arranged so that the end regions 7', 7" have radially adjacent peripheral sections 5", 6" of the two expansion tubes 5, 6 extending in overlying relationship to one another. Significant and in particular reproducible deformation values result from the arrangement of the end regions 7, 7" being fixed to one another.

With the expansion tubes having a length of 220 mm, the zone 7 has a length of for example 140 mm. With the outer expansion tube 5 having a tube external diameter of 42.4 mm and a wall thickness of 3.6 mm, the slope of the slots of the outer expansion tube 5 can be designed so that each slot extends over an angle of about 201.25° in going from its one end to its other end. The associated inner expansion tube can have an external diameter of 33.7 mm and a wall thickness of 3.6 mm, with the slope of the slots therein being dimensioned so that these slots extend through an angle of about 102° in going from their one end to their other end. However, these dimensions are given by way of example only, and it will be evident that they can be adapted to the individual circumstances.

An expansion plug equipped in this way is intended to be rammed into a wall, the ground or the like, and indeed so far that the anchor plate 9 is in contact with the surface of the wall. In this initial state the expansion plug has a length 11. After this fitting position has been achieved, the threaded rod 1 is moved in the direction of the arrow 12 relative to the system consisting of the fitting tube 8 and expansion tubes 5, 6, and indeed without any rotation of these parts relative to one another taking place. This can be achieved for example by the use of a hydraulic tensioning device which is supported on the one hand against the anchor plate 9 and which grasps the end of the threaded rod 1 projecting from the anchor plate on the other hand. This movement can equally well be effected by means of a nut which is screwed on to the threaded rod 1 and is supported again on the anchor plate 9, if necessary through the intermediary of an axial bearing. This axial movement of the threaded rod 1 relative to the anchor plate 9 causes a radial expansion of the peripheral sections 5', 6' of the expansion tubes 5, 6, which in the expanded state thus penetrate radially into the surrounding earth or into the other material surrounding the plug. Depending upon the amount of this radial expansion the length 11 of the plug is correspondingly reduced. The force to be expended for this deformation is transferred by the annular shoulder 4 to the expansion tubes which for their part are supported via the fitting tube 8 against the anchor plate 9.

It is an important feature that, by reason of the opposed orientation of the slope of the slots of the inner and outer expansion tubes 6, 5, the inner peripheral sections 6" exert a stiffening and especially a supporting action on the outer peripheral sections 5", so that the expanded structure is characterised by a high degree of rigidity. It is also an important feature that, by reason of the helical shape of the expanded peripheral sections, the expanded structure takes up a ball-like or disc-like shape depending upon the degree of expansion, so that a particularly strong connection is made with the surrounding ground.

In the illustrated embodiment the system of the expansion tubes 5, 6 is shown located at the bottom end of the expansion plug, i.e. immediately adjacent to the driving tip. This is of course not mandatory. The system of expansion tubes could equally well be arranged at any position along the threaded rod 1, possibly with further fitting tube elements in contact at the driving tip which for their part would only exert an axial supporting function.

Additionally, viewed along the length of the threaded rod, one could possibly provide two or more systems of coaxial expansion tubes arranged stacked one upon another, possibly with the provision of fitting tube sections in between.

The threaded rod can be lengthened by means of threaded sleeves in a simple manner for the purpose of adapting its length, and because its thread extends uniformly over its full length it can be cut to intermediate lengths as need arises, with these intermediate lengths being matched to particular demands.

In a further variation of this embodiment the division into a fitting tube and the system of expansion tubes can be eliminated and as a consequence the expansion tubes extend over the full length of the expansion plug and are equipped with the system of slots described above only at one or more sections positioned as desired.

The degree of slope of the slots can likewise be varied within wide limits, and indeed from slots which extend parallel to the axis or substantially parallel to the axis up to slots which only have a comparatively shallow inclination. The starting point for the question of the dimensioning of the degree of slope, and also for the relative arrangement of the peripheral sections of the expansion tubes in one another, is that the expanded circumferential sections should exert an optimum support and reinforcing function on each other, and a ball-shaped or disc-shaped expanded body should be achieved as far as possible. This means that the inclination of the slots of expansion tubes adjacent to one another should be such that the expanded peripheral sections extend below lower angles to each other in their central region. This also means that relatively steep, mutually opposed threaded slopes of said at least two expansion tubes are to be preferred.

The tensioning element has been illustrated above as a threaded rod 1, consequently as a relatively massive rod. Again, this is not mandatory.

Figure 6:
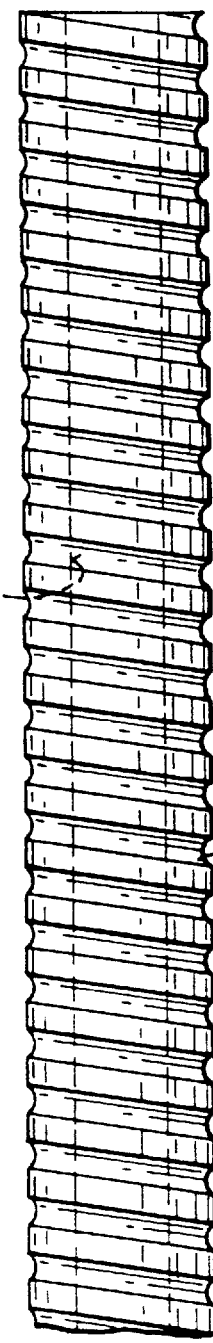
FIG. 6 is an illustration of an alternative embodiment of tensioning member for the expansion plug shown in FIG. 1.

FIG. 6 shows a variant of the tensioning member, which here is shown formed as a tubular body 14 provided with a central longitudinal passage 13 therethrough. This tubular body 14 can in exactly the same way take on the function of a tensioning member within the framework of the expansion plug of the present invention. At the one end of the tubular member one can fit in any way, for example by screwing, either a driving tip or some other closure member, or even a drill head.

This means that the expansion plug of the present invention is utilisable simultaneously as a drilling rod, in which case the central longitudinal bore 13 is used for the passage of a flushing agent which exits through suitable bores in the region of the drill head and/or in regions of the tubular member 14 adjacent to the drill head and/or in the region of the expansion tubes, with the flushing agent picking up small particles of matter freed as a consequence of the drilling process and flushing them out through the annular chamber between the outside of the tubular member 14 and the inside of the borehole. For this, any drill head provided with flushing holes can be used, each set in the usual way on drilling rods, so that it is not considered necessary actually to illustrate the drill head in the drawings.

At the same time this opens up the possibility of using the expansion plug in the manner of an injection drilling anchor or a self-drilling anchor. This means that the expansion plug remains in the bore as a "lost tool" after the bore has been created. A mortar suspension or some other hardenable medium, for example synthetic resin, is introduced into the borehole by way of the longitudinal bore 13 and the system of bores in the region of the drill head and/or of the tubular member 14, and this material fills the annular chamber which is on the outside of the tubular member 14 and the inside of the borehole, penetrates into the rock crevices or the like which are present and in this way produces a reliable bond with the surrounding ground or the other material. This introduction of mortar can be effected simultaneously with or immediately after the aforesaid expansion process, so that the expanded region is especially uniformly bonded into the hardenable medium, so that as a result a particularly reliable bond with the material surrounding the borehole is achieved.

Corrosion protection for the expansion plug can be effected in various ways. For example the outside of the tensioning member, namely the threaded rod 1 or alternatively the tubular member 14, can be bonded into a plastics sheath which, in the latter case, further reinforces the corrosion protection given by the plug being bonded into a hardenable medium. Other parts of the expansion plug which are not overlaid with plastics material or which are not bonded into a hardenable medium can be manufactured from stainless steel. The system of expansion tubes does not automatically have to be bonded into a substance, for example the ground. It can equally well be provided in the air for the formation of a support or abutment, in which case a maximum expansion for the purpose of forming a disc-like expanded body is attempted, so that by a screwing of the tensioning member relative to the anchor plate a connection of two parts which are connected to each other by way of the expansion plug is possible.

If an injection drilling rod is used, which is provided with at least one section which is expandable in the above sense, which section is designed for the receipt inside it of a tensioning rod or some other tensioning element, for example a tubular body, this gives a double corrosion protection for the central tensioning member, because on the one hand the outer tube is bonded in mortar and on the other hand the outer tube is filled with mortar into which the tensioning member is embedded.

The expansion process can essentially be brought about also by means of a torsional movement of the system of expansion tubes.

Figure 7:
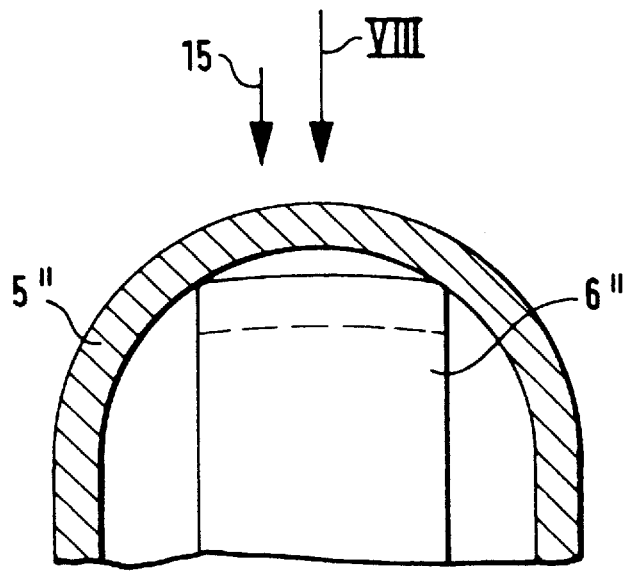
FIG. 7 is a schematic illustration of the contact region of the peripheral sections of the two expansion tubes in the expanded state.

As can be seen from the embodiment shown in FIG. 7, the peripheral sections 5", 6" extend perpendicular to one another in their central region, namely the region of maximum radial expansion. However, this is an extreme case and the angle of intersection can be smaller, for example 45°. It is important however that by means of the peripheral section 5" an optimum rigidity against bending stresses is achieved, the direction of such stresses being perpendicular to the plane of the drawing of FIG. 7, in contrast to which the peripheral section 6" gives a rigidity against those bending stresses whose effect acts in the plane of the drawing of FIG. 7. At the same time, by means of the peripheral section 6", a stiffening effect is exerted on the profile of the peripheral section 5", with the result that its shape is stabilised in particular against radial stresses, i.e. those acting in the direction of the arrow 15. Additional stiffening occasioned by shape can be achieved by having further peripheral sections within the peripheral section 6", although no such further sections are shown in FIG. 7.

Figure 8:
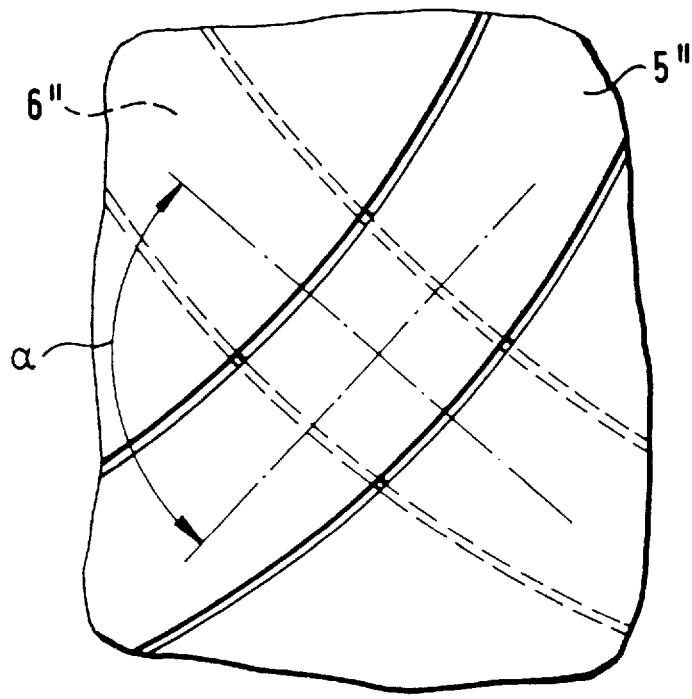
FIG. 8 is a view taken along the line of the arrow VIII in FIG. 7.
Figure 9:
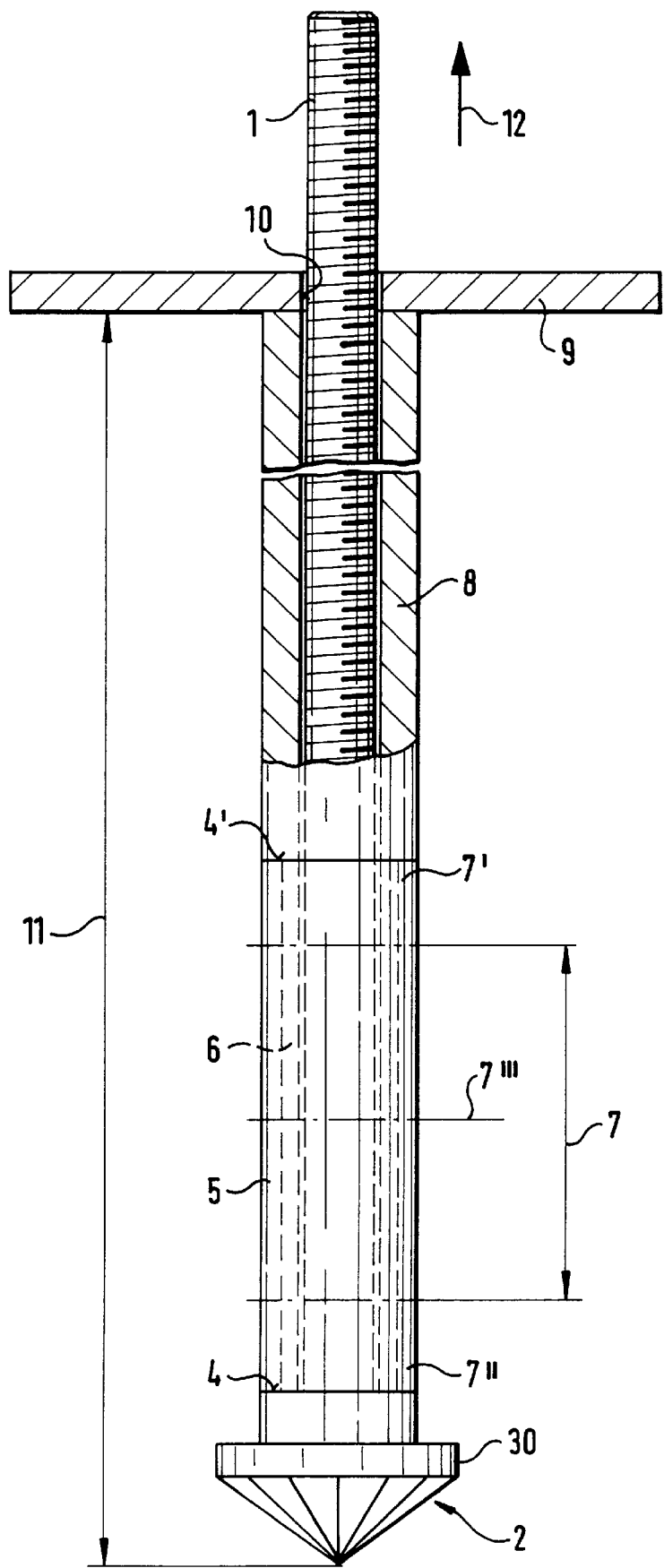
FIG. 9 is a view substantially corresponding to the view of FIG. 1 but showing a differently formed end of a tensioning member of the inventive expansion plug.

FIG. 8 shows just by way of example an angle of intersection α of the orientation of the peripheral sections 5", 6" in the region of the greatest radial expansion, shown in FIG. 7. The drawing also makes clear the directions of maximum bending resistance of the expanded body formed in this way. FIG. 9 shows a tensioning element 1 which substantially corresponds to the tensioning element of FIG. 1 but instead provided with a drill head at its end which faces a bore hole bottom.

Figure 10:
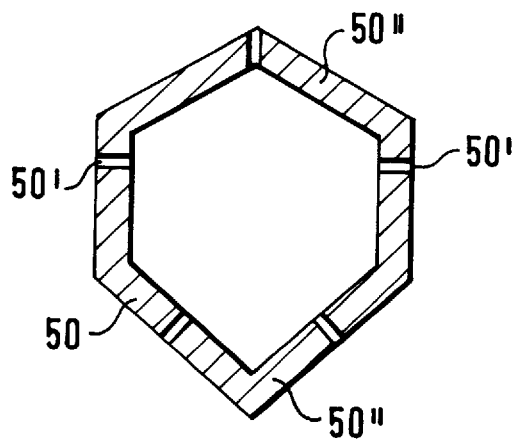
FIGS. 10–12 are views showing several embodiments of the expansion tube of the inventive expansion plug.
Figure 11:
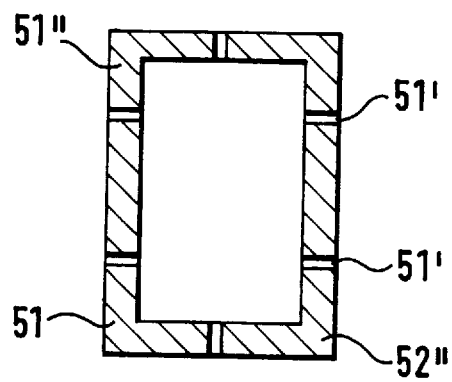
Figure 12:
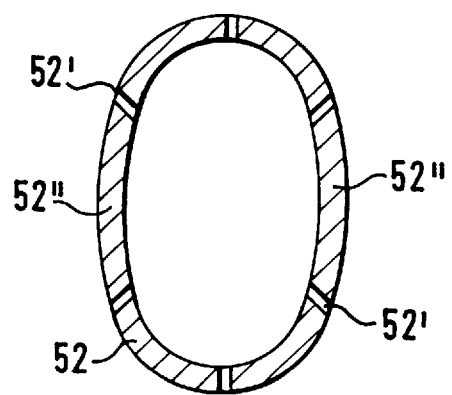

FIGS. 10–12 show several embodiments of a cross-section of the expansion tube 5 identified with reference numerals 50, 51 and 52. Here the slots are identified with 50', 51' and 52', and the peripheral portions between the slots are identified with 50", 51" and 52".

Figure 13:
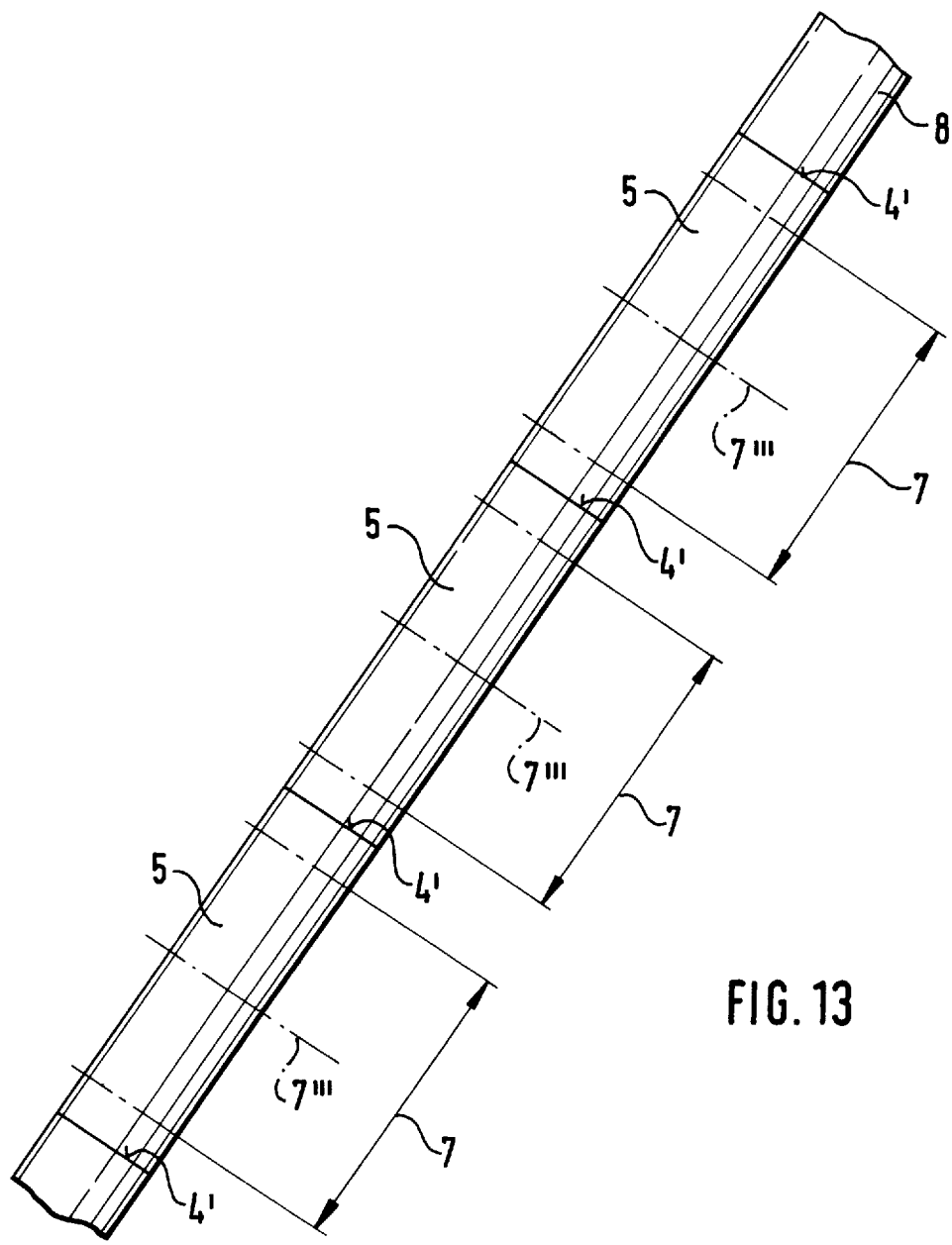
FIG. 13 shows a further embodiment of the expansion plug with several expansion tubes.

In the embodiment of FIG. 13 the expansion tubes 5 which surround the tensioning element 1 are arranged one after the other and inserted in one another so as to axially abut against one another. Reference numeral 4' identifies a ring shoulder or an end side of the individual expansion tube, through which the expansion tubes abut against one another at their end sides. Reference numeral 7''' identifies a corresponding radial plane of cementry, so that reference numeral 7 identifies the axial region in which the slots shown in FIGS. 10–12 extend.

Figure 14:
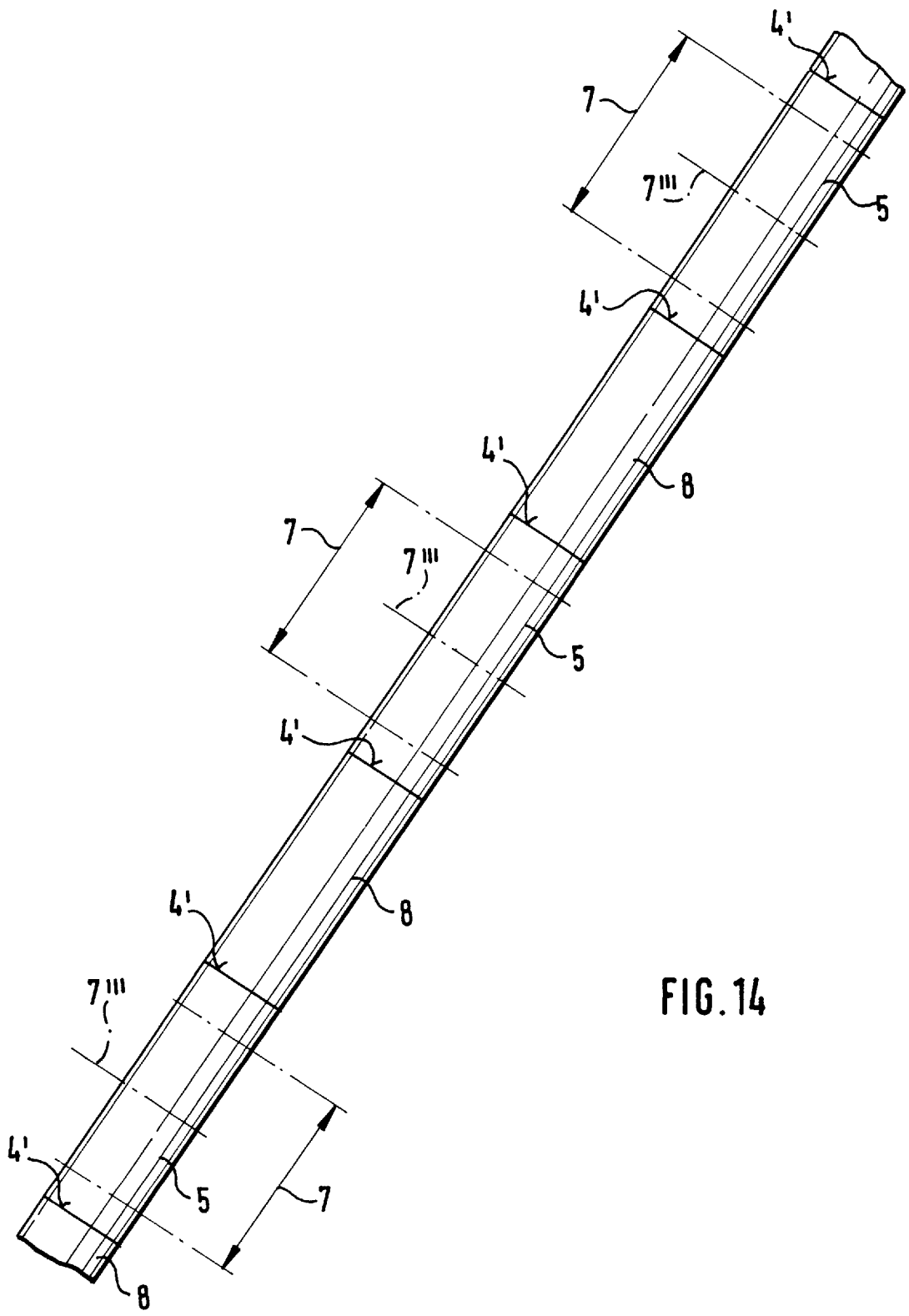
FIG. 14 is a view substantially corresponding to the view of FIG. 13 and additionally showing mounting tubes.

The embodiment of FIG. 14 differs from the embodiment of FIG. 13 only by mounting tubes 8 provided between individual extension tubes 5 and abutting axially against one another.

The object of the invention is consequently in every case the production of an expanded body whose rigidity is substantially due to shape considerations.

The expanded zone can equally well be used as an abutment or stop against a wall.

It will be understood that each of the elements described above, or two or more together, may also find a useful application in other types of constructions differing from the types described above.

While the invention has been illustrated and described as embodied in an expansion plug, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

It is claimed:

1. An expansion plug, comprising at least one tensioning member; an expansion means formed by a system of at least two expansion tubes encircling said tensioning member and fitted one within another, each of said expansion tubes being provided with a series of slots which are equally spaced in a circumferential direction to retain peripheral sections of said expansion tubes between said slots, said slots extending over a part of a length of said expansion tubes, said tensioning member and said at least two expansion tubes being dimensioned and shaped so that by inserting an axial relative movement said peripheral sections are radially expanded in order to achieve an anchoring effect, said slots of said at least two expansion tubes having a shape which is helical in relation to an axis of a respective one of said expansion tubes, said slots having a slope such that said slope of radially adjacent ones of said expansion tubes are of mutually opposite hand, said expansion tubes being arranged to be non-rotatable relative to one another.

2. An expansion plug as defined in claim 1, wherein said expansion tubes are smooth-walled.

3. An expansion plug as defined in claim 1, wherein said expansion tubes include a radially outermost expansion tube, at least said radially outermost expansion tube being provided with an external thread.

4. An expansion plug as defined in claim 3, wherein said external thread extends over a whole length of said radially outermost expansion tube.

5. An expansion plug as defined in claim 1, wherein said expansion tubes have the same length.

6. An expansion plug as defined in claim 1, wherein said expansion tubes extend substantially along a whole length of said tensioning member.

7. An expansion plug as defined in claim 1, wherein said expansion tubes extend along a part of a length of said tensioning member.

8. An expansion plug as defined in claim 1, wherein said expansion tubes, for carrying out the expansion of said peripheral sections, are tensioned between a connection point with said tensioning member arranged to introduce an axially directed pressure force and a point arranged to take up a reaction force.

9. An expansion plug as defined in claim 8, wherein said expansion tubes are tensioned with an intermediary of at least one fitting tube between said points.

10. An expansion plug as defined in claim 8, wherein said connection point is formed by a rigid connection between said expansion tubes and said tensioning member.

11. An expansion plug as defined in claim 8; and further comprising an anchor plate provided to take up the reaction force and connected with at least one of said fitting tube and said expansion tubes, said connection point being formed by an annular shoulder which is connected fixedly to said tensioning member and arranged and shaped for contact with an element selected from the group consisting of said fitting tube and said expansion tube in the first occasion and from said expansion tube and said fitting tube on the second occasion.

12. An expansion plug as defined in claim 11; and further comprising a closure member arranged at an end remote from said anchor plate and connected to an element selected from the group consisting of said tensioning member, said expansion tube and said fitting tube.

13. An expansion plug as defined in claim 12, wherein said closure member is a driving tip.

14. An expansion plug as defined in claim 12, wherein said closure member is a drill head.

15. An expansion plug as defined in claim 1, wherein said expansion tubes have a circular cross-section.

16. An expansion plug as defined in claim 1, wherein said expansion tubes have a polygonal cross-section selected from the group consisting of a rectangular cross-section, a square cross-section and an oval cross-section.

17. An expansion plug as defined in claim 1, wherein said expansion tubes are arranged so that a plurality of arrays of said expansion tubes which are nested are arranged along said tensioning member.

18. An expansion plug as defined in claim 17, wherein said arrays of said expansion tubes are arranged with intermediate fitting tubes.

19. An expansion plug as defined in claim 17, wherein a number of slots of all said expansion tubes of one said nested expansion tube array is the same.

20. An expansion plug as defined in claim 1, wherein said tensioning member is a threaded rod.

21. An expansion plug as defined in claim 1, wherein said tensioning member is a tubular member provided with a longitudinal bore and having an external uniform thread on an external surface of said tubular member.

22. An expansion plug as defined in claim 21, wherein said external thread extends over a full length of said tubular member.

23. An expansion plug as defined in claim 1, wherein said expansion tubes have tapering sections of substantially a same conicity.

24. An expansion plug as defined in claim 1, wherein each of said expansion tubes has a tapering section.

25. An expansion plug as defined in claim 1, wherein each of said expansion tubes has at least two tapering sections which narrow in different directions.

26. An expansion plug as defined in claim 1, wherein said expansion tubes have tapering sections, said slots being arranged in a region of said tapering sections.

27. An expansion plug as defined in claim 1, wherein in an expanded state said peripheral sections of radially adjacent ones of said expansion tubes intersect in a central zone at an angle α which is at most equal to 90°, said slots of all of said expansion tubes extending in an axial direction symmetrically in relation to a plane.

28. An expansion plug as defined in claim 1, wherein said expansion tubes are composed of a material selected from the group consisting of metal and plastic.

\* \* \* \* \*